US012669575B2

(12) United States Patent
Himmelstoss

(10) Patent No.: US 12,669,575 B2
(45) Date of Patent: Jun. 30, 2026

(54) RADAR SENSOR HAVING HOLLOW WAVEGUIDE STRUCTURE

(71) Applicant: Robert Bosch GmbH, Stuttgart (DE)

(72) Inventor: Armin Himmelstoss, Weissach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 162 days.

(21) Appl. No.: 18/557,046

(22) PCT Filed: Sep. 7, 2022

(86) PCT No.: PCT/EP2022/074827
§ 371 (c)(1),
(2) Date: Oct. 24, 2023

(87) PCT Pub. No.: WO2023/041393
PCT Pub. Date: Mar. 23, 2023

(65) Prior Publication Data
US 2024/0241218 A1 Jul. 18, 2024

(30) Foreign Application Priority Data

Sep. 14, 2021 (DE) ..................... 10 2021 210 123.2

(51) Int. Cl.
*G01S 7/03* (2006.01)
(52) U.S. Cl.
CPC ..................................... *G01S 7/03* (2013.01)

(58) Field of Classification Search
CPC . G01S 7/03; G01S 7/032; H01P 5/087; H05K 1/0243; H05K 2201/10098; H05K 3/3436
See application file for complete search history.

(56) References Cited

U.S. PATENT DOCUMENTS

| | | | | |
|---|---|---|---|---|
| 3,146,410 A | * | 8/1964 | Butler ..................... | H01P 5/107 333/34 |
| 5,982,256 A | * | 11/1999 | Uchimura ............ | H05K 1/0219 333/248 |
| 6,740,576 B1 | * | 5/2004 | Lin ..................... | H01L 23/5389 438/599 |

(Continued)

FOREIGN PATENT DOCUMENTS

| | | |
|---|---|---|
| DE | 102006019054 B4 | 3/2019 |
| JP | 2008252207 A | 10/2008 |

OTHER PUBLICATIONS

International Search Report for PCT/EP2022/074827, Issued Dec. 19, 2022.

(Continued)

*Primary Examiner* — Peter M Bythrow
(74) *Attorney, Agent, or Firm* — NORTON ROSE FULBRIGHT US LLP

(57) ABSTRACT
A radar sensor. The radar sensor has a hollow waveguide structure and a high-frequency module, which are arranged on opposite sides of a printed circuit board, and has a coupling device for transmitting microwave signals between the high-frequency module and the hollow waveguide structure, the coupling device having a dielectric waveguide manufactured separately from the printed circuit board.

12 Claims, 4 Drawing Sheets

(56) References Cited

U.S. PATENT DOCUMENTS

| | | | | | |
|---|---|---|---|---|---|
| 8,283,764 | B2 * | 10/2012 | Tang | ..................... | H01L 23/055 |
| | | | | | 438/66 |
| 10,225,925 | B2 * | 3/2019 | Qiang | ....................... | G01S 7/03 |
| 10,992,015 | B2 * | 4/2021 | Uemichi | ................. | H01P 5/087 |
| 11,350,522 | B2 * | 5/2022 | Khan | ....................... | H01L 24/13 |
| 2006/0097906 | A1 * | 5/2006 | Heide | ..................... | G01S 7/032 |
| | | | | | 342/22 |
| 2006/0274992 | A1 * | 12/2006 | Shimura | .................. | H01P 5/08 |
| | | | | | 385/39 |
| 2007/0013581 | A1 * | 1/2007 | Iijima | .................... | G01S 7/032 |
| | | | | | 257/E23.114 |
| 2007/0109178 | A1 * | 5/2007 | Schultheiss | .......... | G01F 23/284 |
| | | | | | 342/124 |
| 2011/0267152 | A1 * | 11/2011 | Lee | ......................... | H01P 3/121 |
| | | | | | 333/33 |
| 2012/0013499 | A1 * | 1/2012 | Hayata | ............. | H01L 23/49805 |
| | | | | | 342/112 |
| 2012/0050131 | A1 * | 3/2012 | Hashimoto | ............. | H01P 1/042 |
| | | | | | 29/601 |
| 2013/0256850 | A1 * | 10/2013 | Danny | ................... | H01L 23/66 |
| | | | | | 257/664 |

| | | | | | |
|---|---|---|---|---|---|
| 2015/0048471 | A1 * | 2/2015 | Hasch | .................... | H01P 5/107 |
| | | | | | 257/664 |
| 2018/0108971 | A1 * | 4/2018 | Connor | ................... | H01P 5/103 |
| 2019/0067780 | A1 * | 2/2019 | Kirino | ...................... | H01P 3/16 |
| 2019/0191545 | A1 * | 6/2019 | Motzer | ............... | H05K 1/0243 |
| 2019/0334220 | A1 * | 10/2019 | Ali | ................... | H01L 23/49838 |
| 2020/0112075 | A1 * | 4/2020 | Myers | ................. | H05K 1/0233 |
| 2020/0136225 | A1 * | 4/2020 | Shi | ......................... | H01L 23/66 |
| 2020/0243463 | A1 * | 7/2020 | Koch | ............... | H01L 23/49816 |
| 2020/0264030 | A1 * | 8/2020 | Mueller | .................. | G01S 7/032 |
| 2021/0305672 | A1 * | 9/2021 | Hitzler | ..................... | H01P 3/12 |
| 2021/0341568 | A1 * | 11/2021 | Hitzler | .................. | H01Q 1/225 |
| 2022/0415830 | A1 * | 12/2022 | Erdoel | ................ | H01Q 1/2283 |

OTHER PUBLICATIONS

Gomi et al., "Low-Loss GCPW-To-WG Transition in Multilayer Resin Substrate for Millimeter-Wave Applications," Proceedings of the 42nd European Microwave Conference, IEEE, 2012, pp. 285-288. <https://sci-hub.ru/10.23919/eumc.2012.6459421> Downloaded Oct. 19, 2023.

* cited by examiner

RADAR SENSOR HAVING HOLLOW WAVEGUIDE STRUCTURE

FIELD

The present invention relates to a radar sensor having a hollow waveguide structure and a high-frequency module, which are arranged on opposite sides of a printed circuit board, and having a coupling device for transmitting microwave signals between the high-frequency module and the hollow waveguide structure.

The present invention is particularly concerned with a radar sensor for motor vehicles, for example for detecting the traffic environment in the context of a driver assistance system or autonomous driving system.

BACKGROUND INFORMATION

A radar sensor for motor vehicles in which an antenna array for sending the radar signal and for receiving the radar echo is formed by a hollow waveguide structure, which is connected to the high-frequency module via a coupling device, is described in German Patent No. DE 10 2006 019 054 B4. In this radar sensor, the hollow waveguide structure and the high-frequency module are located on the same side of the printed circuit board.

In addition, radar sensors are provided in which the hollow waveguide structure and the high-frequency module are located on opposite sides of the printed circuit board, so that the coupling device has to transmit the microwave signal either through the printed circuit board or around the printed circuit board. In these cases, the coupling device is formed by, for example, a drill hole which passes through the printed circuit board and whose inner surfaces may optionally be metallized, the interior of the drill hole being filled with either air or another dielectric material.

In coupling devices of this type, the transmission properties are dependent on the properties of the printed circuit board, especially the thickness and material of the board or—in the case of a multilayer printed circuit board—additionally on its internal structure. If the coupling device has metallized surfaces, then the metallization, especially the surface roughness, also has an influence on the transmission properties. Special matching networks are thus necessary in order to achieve a low-loss transmission of the microwave signals between the high-frequency module and the hollow waveguide structure. Owing to inevitable manufacturing deviations during production of the printed circuit boards, the design of the matching networks is relatively complex.

When radar sensors are manufactured in a variety of design variants with different hollow waveguide structures and/or different high-frequency modules, the printed circuit board and the coupling device formed within it generally have to be adapted to the individual design variant.

SUMMARY

An object of the present invention is to provide a radar sensor of the aforementioned type in which the coupling device is more easily adaptable to the other components.

This object may be achieved in accordance with an example embodiment of the present invention in that the coupling device has a dielectric waveguide manufactured separately from the printed circuit board.

Dielectric waveguides are conductors which consist of a dielectric material and in which the microwaves are able to propagate only inside the conductor, because of refraction and/or reflection.

Since the dielectric waveguide is not part of the printed circuit board, its waveguiding properties are independent of the properties of the printed circuit board, even if the dielectric waveguide passes through a drill hole or via in the printed circuit board. The susceptibility to deviations during manufacture of the printed circuit board, when producing metallized surfaces and the like, is considerably reduced in this way.

It is possible to optimize the coupling to the hollow waveguide structure on the one hand and to the high-frequency module on the other through an appropriate choice of geometry of the respective ends of the dielectric waveguide, so as to produce low-loss transitions, without the need for any changes to the printed circuit board. In addition, the dielectric waveguide offers greater design freedom with regard to the arrangement of the coupling points on the hollow waveguide structure and on the high-frequency module.

Advantageous embodiments and developments of the present invention are disclosed here.

According to an example embodiment of the present invention, if the dielectric waveguide passes through a drill hole of the printed circuit board, the waveguide may be held in the drill hole by suitable fixing elements, such as spring elements or clamping elements, in such a way that its entire perimeter is held at a distance from the inner walls of the drill hole.

According to an example embodiment of the present invention, if, for example, the high-frequency module has a BGA/eWLB housing with electrical contacts formed by solder balls, then the waveguide may be coupled to the high-frequency module in a non-contact manner by way of a solder ball.

According to an example embodiment of the present invention, alternatively, the waveguide may touch the solder ball or another contact surface of the BGA/eWLB. In this case, a resilient fixing element design is necessary to ensure that contact is always maintained.

Alternatively, the high-frequency module may have an integrated coupling point (emitter and/or antenna) on the surface or in the interior of its housing. In this case, the dielectric waveguide may be arranged and routed in such a way that it is coupled directly to this coupling point.

On the hollow waveguide structure side, the coupling may be achieved by inserting the dielectric waveguide into an open end of a hollow waveguide, for example.

According to an example embodiment of the present invention, on both the hollow waveguide structure side and the high-frequency module side, the dielectric waveguide may project a considerable way out of the drill hole of the printed circuit board. This projecting section of the waveguide may optionally also be bent or curved, so that coupling points of the hollow waveguide structure or of the high-frequency module that are further away from the drill hole of the printed circuit board may also be reached.

Exemplary embodiments of the present invention are described in more detail below with reference to the figures.

DETAILED DESCRIPTION OF EXAMPLE EMBODIMENTS

Figure 1:
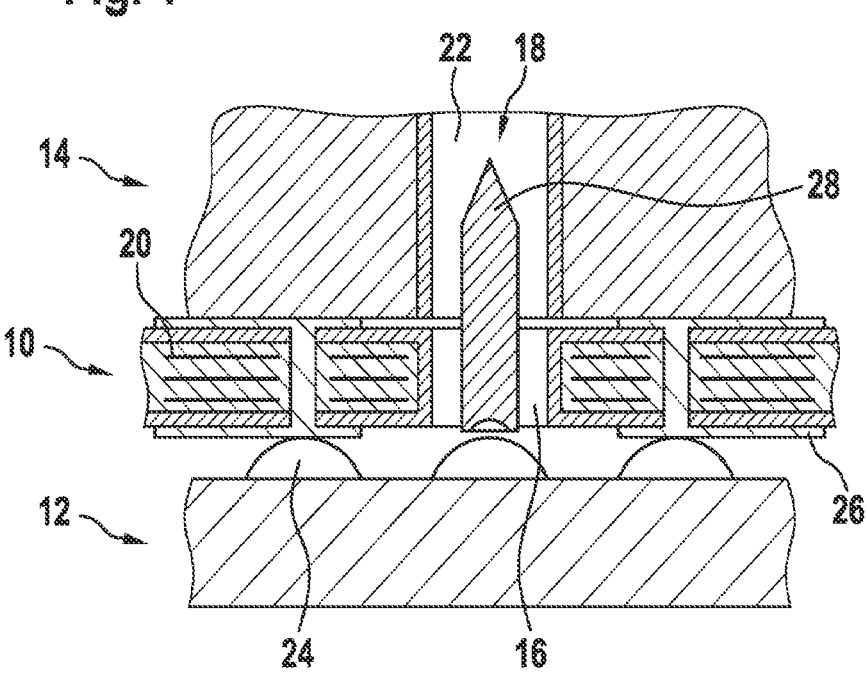
FIG. 1 shows a partial section of a printed circuit board, a hollow waveguide structure, a high-frequency module and a coupling device according to an example embodiment of the present invention.

FIG. 1 shows a sectional view of part of a printed circuit board 10 (PCB) of a radar sensor, which is populated with a high-frequency module 12 on one side (the underside in FIG. 1) and with a hollow waveguide structure 14 on the opposite side. High-frequency module 12 and hollow waveguide structure 14 are interconnected by way of a coupling device 18 which passes through a drill hole 16 of printed circuit board 10, so that a microwave signal generated in high-frequency module 12 may be coupled into hollow waveguide structure 14. Hollow waveguide structure 14 may be a hollow waveguide antenna, for example, via which the microwave signal is emitted. Conversely, radar echoes received by the hollow waveguide antenna may be transmitted via coupling device 18 to high-frequency module 12 for further analysis.

In the example shown, printed circuit board 10 has a plurality of parallel electrically conductive layers 20, which interconnect various components (not illustrated) of the radar sensor. Hollow waveguide structure 14 is located directly on printed circuit board 10 and has a hollow waveguide 22, which is aligned with drill hole 16 of the printed circuit board and is open to printed circuit board 10, to enable it to be coupled to high-frequency module 12.

In the example shown, high-frequency module 12, for example a monolithic microwave integrated circuit (MMIC) or a system-on-chip (SoC), has a BGA/eWLB housing with a grid of solder balls 24 for contacting and securing to printed circuit board 10. In the example shown, two of these solder balls 24 are in electrical contact with a shield 26, which is spaced apart from and surrounds coupling device 18.

The key element of coupling device 18 is a pin-shaped dielectric waveguide 28, which extends freely through drill hole 16 of printed circuit board 10 and is held in said drill hole in a manner not shown in detail in FIG. 1, such that one end extends into hollow waveguide 22 while the opposite (lower) end is positioned opposite and not in contact with one of solder balls 24, via which the microwave signal is coupled into or out of waveguide 28. The geometries of the opposite ends of dielectric waveguide 28 are matched to the geometries of hollow waveguide 22 and of the solder ball in such a way that a low-loss transmission of the microwave power is achieved.

Figure 2:
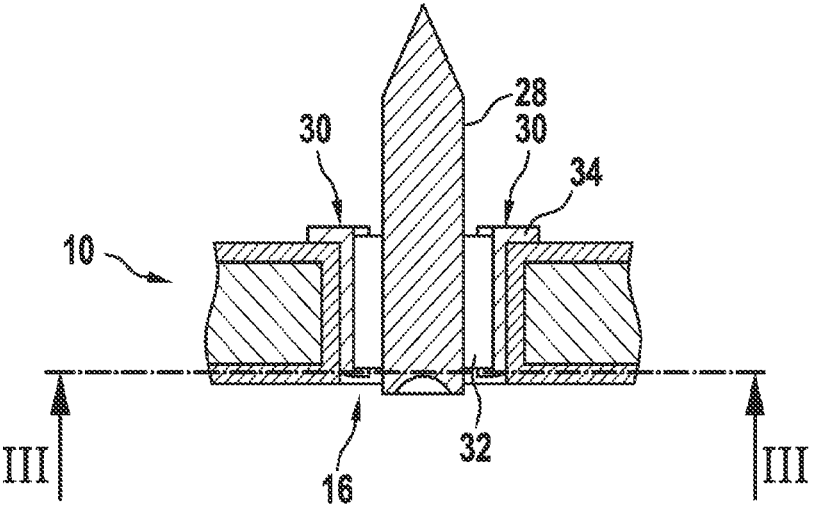
FIG. 2 shows an enlarged detail of FIG. 1 to illustrate a method of securing a dielectric waveguide.

An example of a possible method of securing dielectric waveguide 28 in drill hole 16 of printed circuit board 10 is shown in FIG. 2. In this example, waveguide 28 is integrally formed with two diametrically opposed clamping elements 30, which bear against the inner wall of drill hole 16 and are connected to the main part of the waveguide by way of resilient webs 32. In this way, waveguide 28 is centered in drill hole 16 and held at a distance from the walls of the drill hole. Clamping elements 30 each have a lead-in chamfer at the lower end, which makes it easier to insert waveguide 28 into drill hole 16. At the opposite end, the clamping elements each have a stop 34, which in the final assembled state rests on the surface of printed circuit board 10 and thus defines a precise axial position for the waveguide.

Figure 3:
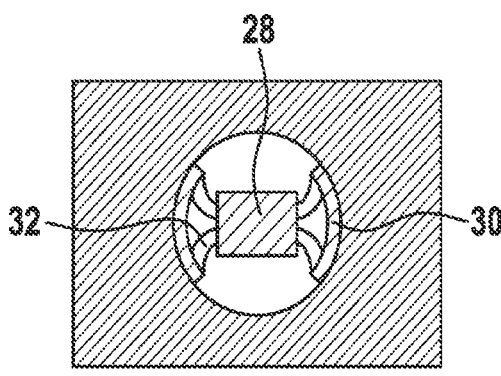
FIG. 3 shows a section along line III-III in FIG. 2.

In the example shown, waveguide 28 has a rectangular cross-section, as may be seen in FIG. 3. The cross-section of clamping elements 30 and the contours of resilient webs 32 are also visible in FIG. 3.

Alternative methods of securing dielectric waveguide 28 are also possible, however. For example, the waveguide could be fixed by introducing a filling compound of a suitably chosen dielectric constant into drill hole 16 to surround the waveguide.

Figure 4:
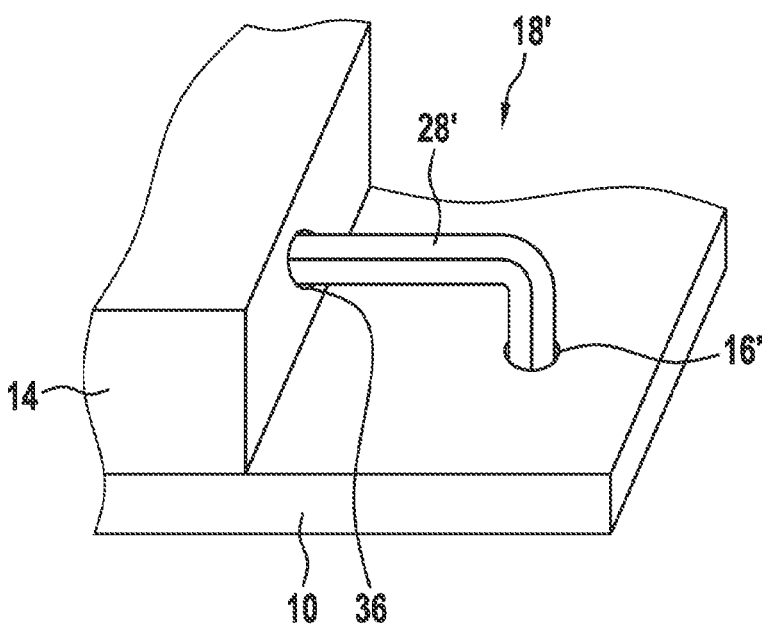
FIG. 4 shows a partial perspective view of a hollow waveguide structure, a printed circuit board and a dielectric waveguide according to another exemplary embodiment of the present invention.

FIG. 4 shows a perspective view of another exemplary embodiment of a coupling device 18', which passes through a drill hole 16' of printed circuit board 10 and connects hollow waveguide structure 14 to a high-frequency module, which in FIG. 4 is located out of sight on the underside of printed circuit board 10. In this example, hollow waveguide structure 14 has a coupling point 36 located laterally in a side wall of the hollow waveguide structure extending at right angles to the plane of printed circuit board 10.

The key element of coupling device 18' is in this case a dielectric waveguide 28', again with a rectangular cross-section, which projects a considerable way out of drill hole 16' and is bent at right angles, so that the bent end thereof extends into coupling point 36.

Figure 5:
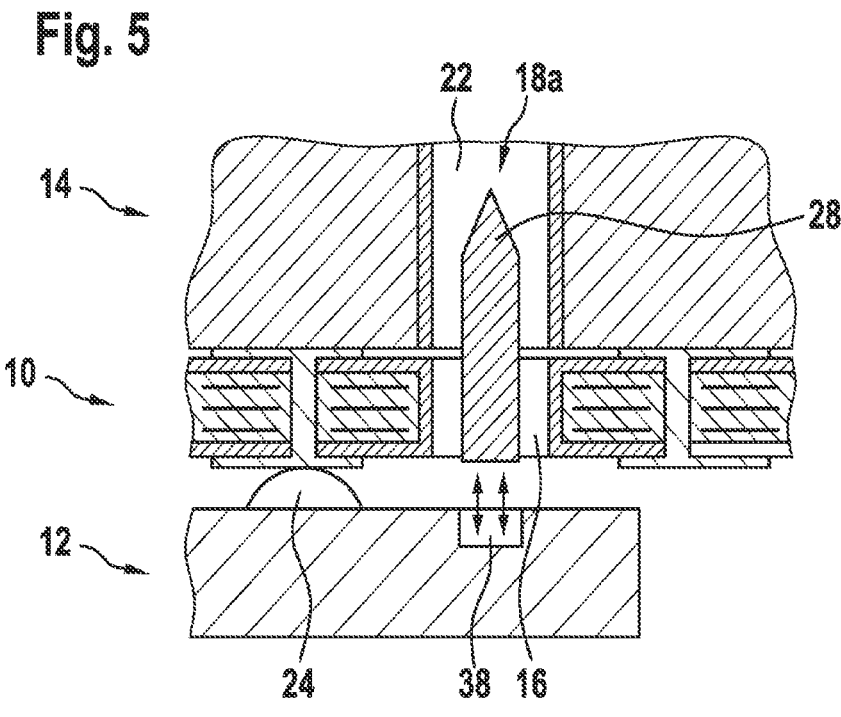
FIGS. 5 through 7 show partial sections analogous to FIG. 1, for different ways of coupling the dielectric waveguide to the high-frequency module.
Figure 6:
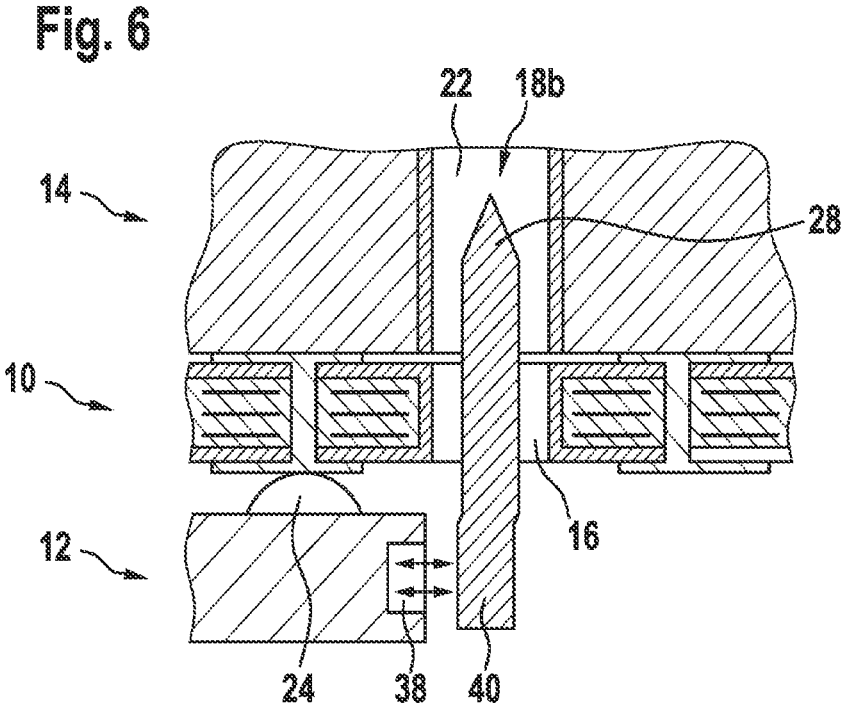
Figure 7:
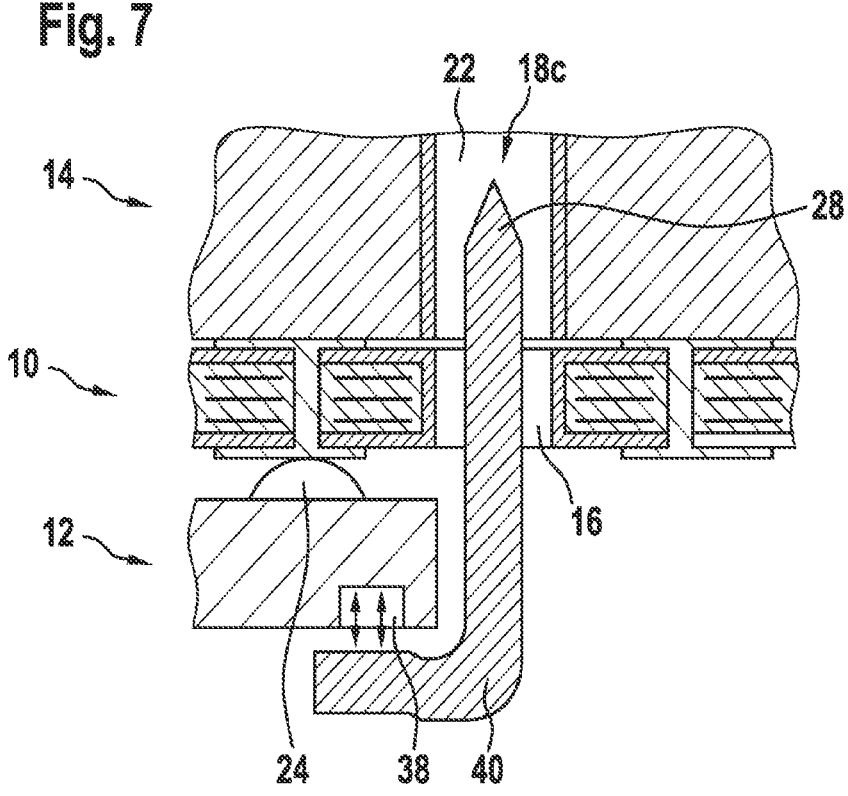

FIGS. 5 through 7 show examples of coupling devices 18a, 18b, 18c, which differ from coupling device 18 as shown in FIG. 1 through different ways of coupling dielectric waveguide 28 to high-frequency module 12.

In FIG. 5, high-frequency module 12 is arranged on printed circuit board 10 in such a way that its edge extends beyond drill hole 16 of the printed circuit board. An integrated coupling point 38 (emitter and/or antenna or optionally direct contact), positioned opposite the end of dielectric waveguide 28, is formed in the housing of high-frequency module 12, on the side facing printed circuit board 10, in a position aligned with drill hole 16.

In FIG. 6, the arrangement is chosen such that drill hole 16 is located outside the perimeter of high-frequency module 12. Coupling point 38 in this case is located in a side wall of the high-frequency module, and dielectric waveguide 28 has a coupling section 40, which projects out of drill hole 16 and is shaped in such a way that it is located opposite and a suitable distance from coupling point 38.

In FIG. 7, coupling point 38 is located on the side of high-frequency module 12 facing away from printed circuit board 10, and coupling section 40 of waveguide 28 passes around the edge of high-frequency module 12.

What is claimed is:

1. A radar sensor, comprising:
a hollow waveguide structure and a high-frequency module, which are arranged on opposite sides of a printed circuit board relative to one another; and
a coupling device configured to transmit microwave signals between the high-frequency module and the hollow waveguide structure, wherein the coupling device has a dielectric waveguide manufactured separately from the printed circuit board,
wherein the ends of the dielectric waveguide are shaped to match corresponding coupling points of the hollow waveguide structure and the high-frequency module.

2. The radar sensor as recited in claim 1, wherein the dielectric waveguide extends through a drill hole of the printed circuit board.

3. The radar sensor as recited in claim 2, wherein the dielectric waveguide is held in the drill hole of the printed circuit board in such a way that its entire perimeter is held at a distance from an inner wall of the drill hole.

4. The radar sensor as recited in claim 2, wherein the dielectric waveguide is fixed in the drill hole by clamping elements.

5. The radar sensor as recited in claim 4, wherein the clamping elements are connected to the waveguide by way of resilient webs and are biased in a clamping manner against a peripheral surface of the drill hole.

6. The radar sensor as recited in claim 2, wherein the dielectric waveguide passes through the drill hole of the printed circuit board and, on a side of the printed circuit board on which the hollow waveguide structure is arranged, has a section which projects out of the drill hole and bridges a gap between the drill hole and a coupling point of the hollow waveguide structure.

7. The radar sensor as recited in claim 6, wherein the section of the dielectric waveguide that projects out of the drill hole is bent or curved.

8. The radar sensor as recited in claim 1, wherein the high-frequency module has a housing, which is fixed to and in contact with the printed circuit board by way of solder balls, and in which a solder ball of the solder balls forms a coupling site for coupling to the dielectric waveguide, one end of which is positioned opposite the solder ball.

9. The radar sensor as recited in claim 1, wherein the high-frequency module has an integrated coupling point for coupling to the dielectric waveguide, and one end of the waveguide is positioned opposite the integrated coupling point.

10. The radar sensor as recited in claim 9, wherein the coupling point is located in a part of the high-frequency module facing the printed circuit board.

11. The radar sensor as recited in claim 9, wherein the coupling point is located in a lateral surface of the high-frequency module extending at right angles to a plane of the printed circuit board.

12. The radar sensor as recited in claim 9, wherein the coupling point is located in a top surface of the high-frequency module facing away from the printed circuit board.

* * * * *